J. R. ORR & W. RADLEY, Jr.
AUTOMATIC WEED CUTTER AND HOEING ATTACHMENT FOR CULTIVATORS AND PLOWS.
APPLICATION FILED MAY 27, 1912.

1,050,993. Patented Jan. 21, 1913.

Witnesses:
H. A. Huebner.
J. A. Winch.

Inventors:
James R. Orr & William Radley Jr.
by Francis C. Huebner
Attorney.

UNITED STATES PATENT OFFICE.

JAMES R. ORR AND WILLIAM RADLEY, JR., OF FRESNO, CALIFORNIA.

AUTOMATIC WEED-CUTTER AND HOEING ATTACHMENT FOR CULTIVATORS AND PLOWS.

1,050,993.

Specification of Letters Patent. Patented Jan. 21, 1913.

Application filed May 27, 1912. Serial No. 700,115.

*To all whom it may concern:*

Be it known that we, JAMES R. ORR and WILLIAM RADLEY, Jr., citizens of the United States of America, and residing in the city of Fresno, county of Fresno, and State of California, have invented a new and useful Improvement in Automatic Weed-Cutters and Hoeing Attachments for Cultivators and Plows, of which the following is a specification.

Our invention relates to a weed cutter and hoeing attachment for a cultivator or plow which will automatically adjust itself to avoid a vine, tree, or other obstruction which may be in its path. It is especially valuable for use in orchards and vineyards where it is desired to stir the soil and cut out the weeds immediately adjacent to the trunks of the trees and vines, and its object is to thus stir the soil, and cut out the weeds between the trees and vines, and when the trunk of a tree or vine is reached to automatically recede until said trunk is passed, after which it immediately readjusts itself to the position it had before the said trunk was reached. We attain these objects by the mechanism hereinafter described and illustrated in the accompanying drawing in which—

Figure 1:
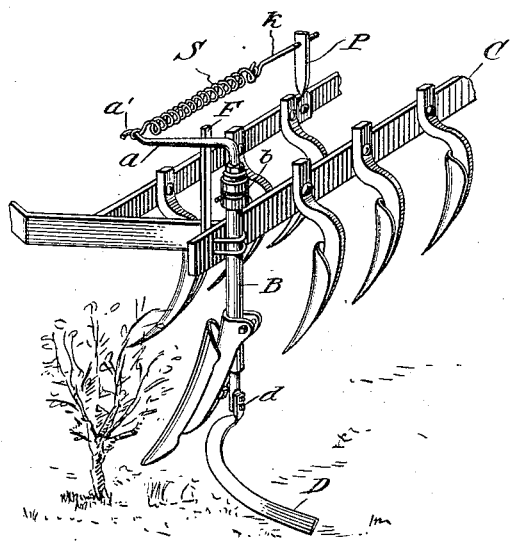
Figure 2:
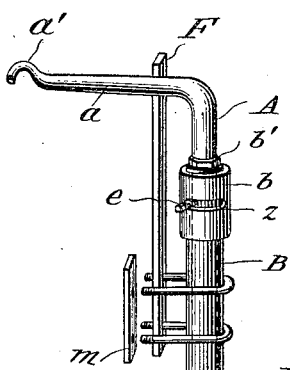
Figure 3:
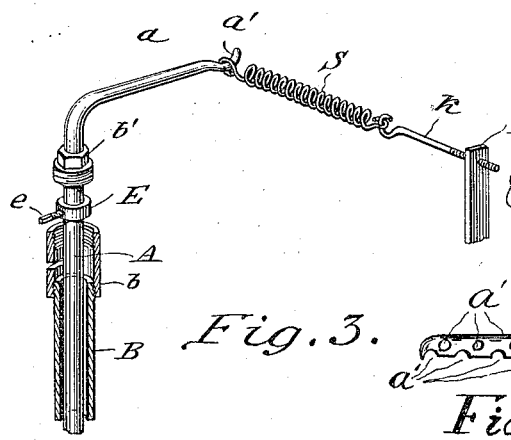
Figure 4:
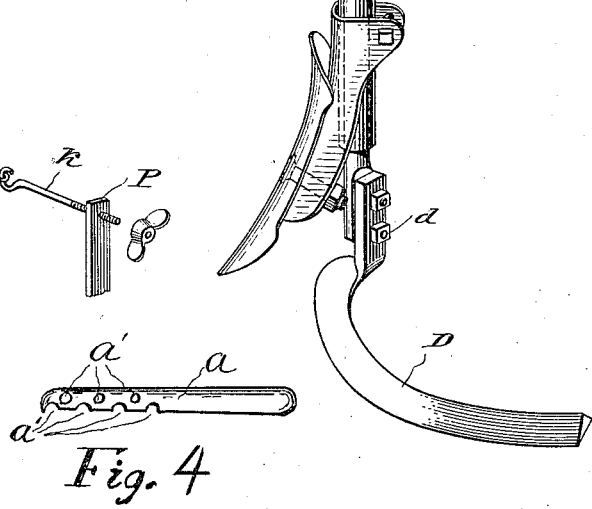

Figure 1 shows a plan of the weed cutter attachment as attached to an ordinary cultivator; Fig. 2 is a side view of the weed cutter attachment. Fig. 3 is a transverse sectional view of a part of said attachment. Fig. 4 is a top view of one form of the lever designated as $a$ in Fig. 2.

In said drawings B is a hollow post which may be fastened to either of the extreme ends of cross-beam C to which the shovel supports of the cultivator are fastened. In our construction we have clamped hollow post B to beam C by means of stirrup bolts which pass around hollow post B and over and under cross-beam C. An ordinary yoke $m$ is passed over the ends of said stirrup bolts on one side, and fastened thereto with screw nuts, while the yoke connecting the stirrups on the other side is elongated upward to form stop-post F, hereinafter more specifically described. By use of the stirrup bolts in this manner we have the additional advantage of being able to adjust hollow post B vertically. At the top of hollow-post B we have attached a sleeve $b$ which has a transverse slot $z$ therein, and in the top of sleeve $b$, bushing $b'$ is inserted. The diameter of the hole in bushing $b'$ is the same as the diameter of the hole in hollow-post B.

A is a rod passing through bushing $b'$, collar $b$, and hollow-post B.

D is a blade preferably the shape of a simitar with the handle bent at right angles to the plane of the blade, and is bolted or otherwise firmly fastened to the lower end of rod A so that it extends in a horizontal direction. Rod A should fit snugly in hollow post B, and should turn freely therein. The upper part of rod A is bent approximately at right angles to the portion of said rod A passing through hollow post B, forming an arm $a$ which may terminate at the end with hook $a'$. Arm $a$ may have a plurality of notches, or holes, either of which may be used for the same purpose as said hook $a'$, hereinafter set forth.

E is a collar which is fitted snugly around rod A, and is firmly fastened thereto by means of a set screw $e$, which works in slot $z$. This adjustable collar is for the purpose of adjusting blade D to the depth it is desired to dig the soil.

P is a post on or about the middle of the cultivator frame.

S is a spiral spring connecting arm $a$ with post P as follows, to-wit: One end thereof is hooked over hook $a'$, and the other end is attached to a screw threaded rod which passes through post P. A winged nut works on said screw threaded rod $k$, by means of which the tension of spring S can be increased or diminished. Stop post F extends upward beyond arm $a$, and in our construction we have bent arm $a$ at such relation to blade D, so that when blade D is adjusted so a line drawn from the point to the back of blade D will be parallel to an extension of beam C, arm $a$ would rest against stop-post F. When in this position spring S should be tightened sufficiently so blade D will remain approximately in the same relative position with cross-beam C when plowing through ordinary soil, but spring S should have a tension sufficiently weak so when the trunk of a vine or tree or other obstruction is struck, blade D can recede sufficiently to pass by such obstruction. When the obstruction is passed, the tension of the spring should be sufficient to pull the blade D to its forward position. The slot z is made long enough so as not to interfere with blade D having sufficient swing to pass any obstacle.

While we have described this device as attached to a cultivator, it may be attached and operated on a plow or weeder. Spiral spring S is preferred in our construction, although torsion or other springs may be used to secure the same results.

What we claim as our invention, and upon what we desire Letters Patent is:

On a cultivator, the combination of a hollow post B terminating at the top with a sleeve, and having a transverse slot in said sleeve, said hollow post being adjustably attached to the end of a cross-bar of said cultivator; a rod A passing through said hollow post and collar, said rod A having a horizontal blade D attached at the lower end thereof; a stop post F extending upward from the frame of said cultivator, the upper end of rod A terminating in a horizontal arm which engages with stop post F when blade D is in line with the cross bar of said cultivator to which hollow post B is attached; a post P at or near the center of the frame of said cultivator, an adjustable spring connecting arm a with post P, and an adjustable collar encircling said rod A where rod A passes through sleeve b, all substantially as described.

JAMES R. ORR.
WM. RADLEY, Jr.

Witnesses:
FRANK KANKE,
DANA K. GIBBS.

---

Copies of this patent may be obtained for five cents each, by addressing the "Commissioner of Patents, Washington, D. C."